(12) United States Patent
Osaki et al.

(10) Patent No.: US 7,900,232 B2
(45) Date of Patent: Mar. 1, 2011

(54) BROADCAST SYSTEM, AND ITS DISTRIBUTION DEVICE AND TERMINAL DEVICE

(75) Inventors: Yoshiro Osaki, Kawasaki (JP); Shinichi Kurihara, Yokohama (JP); Sunao Wada, Yokohama (JP); Yasuo Ooya, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 748 days.

(21) Appl. No.: 11/892,679

(22) Filed: Aug. 27, 2007

(65) Prior Publication Data

US 2008/0069521 A1 Mar. 20, 2008

(30) Foreign Application Priority Data

Sep. 19, 2006 (JP) ............................. 2006-253297
Jul. 30, 2007 (JP) ............................. 2007-197897

(51) Int. Cl.
H04N 7/173 (2006.01)
(52) U.S. Cl. ............................. 725/93; 725/94; 725/95
(58) Field of Classification Search .............. 725/93–95
See application file for complete search history.

(56) References Cited

U.S. PATENT DOCUMENTS

| 7,032,239 | B1 | 4/2006 | Huckins |
| 2004/0001081 | A1 | 1/2004 | Marsh |
| 2006/0095401 | A1* | 5/2006 | Krikorian et al. ............ 707/1 |
| 2006/0209729 | A1 | 9/2006 | Staniec et al. |

FOREIGN PATENT DOCUMENTS

| CN | 1230848 A | 10/1999 |
| CN | 1327684 A | 12/2001 |
| CN | 1520683 A | 8/2004 |
| JP | 2000-13696 | 1/2000 |
| JP | 2003-52030 | 2/2003 |
| JP | 2004-23600 | 1/2004 |
| JP | 2004-023606 | 1/2004 |
| KR | 2006-22470 | 3/2006 |

(Continued)

OTHER PUBLICATIONS

International Search Report issued by the United Kingdom Intellectual Property Office on Dec. 12, 2007, in Application No. GB0716697.8 (4 pages).

(Continued)

Primary Examiner—Hunter B Lonsberry
(74) Attorney, Agent, or Firm—Finnegan, Henderson, Farabow, Garrett & Dunner, L.L.P.

(57) ABSTRACT

A broadcast signal received by a broadcast signal reception unit is separated into program contents and program information by a broadcast signal separation unit. The separated program contents is converted into Internet Protocol (IP) packets by a contents transmission unit then distributed to an IP network. A program information transmission unit converts the separated program information into the IP packets then distributes the IP packets by setting an IP connection differing from that of the transmission unit. A terminal device receives the program contents by a contents reception unit to supply it to a program contents reproduction unit. The program information received by a program information reception unit is stored in a program information memory and output to a display in response to an output request.

9 Claims, 10 Drawing Sheets

FOREIGN PATENT DOCUMENTS

| WO | WO 2007/010779 A1 | 1/2007 |
| WO | WO 2007/049229 A2 | 5/2007 |
| WO | WO 2007/055399 A1 | 5/2007 |

OTHER PUBLICATIONS

Office Action issued by the Japanese Patent Office on May 20, 2008, in Application No. 2007-197897 (2 pages).

Notification for Filing Opinion issued in Korean Counterpart Application No. 10-2007-0087722 (10 pages).

Notification of the Second Office Action issued by the Chinese Patent Office on Dec. 4, 2009, for Chinese Patent Application No. 200710149710.0 and English-language translation thereof.

Official Action issued by the Canadian Intellectual Property Office on Mar. 30, 2010, for Canadian Patent Application No. 2,599,094.

* cited by examiner

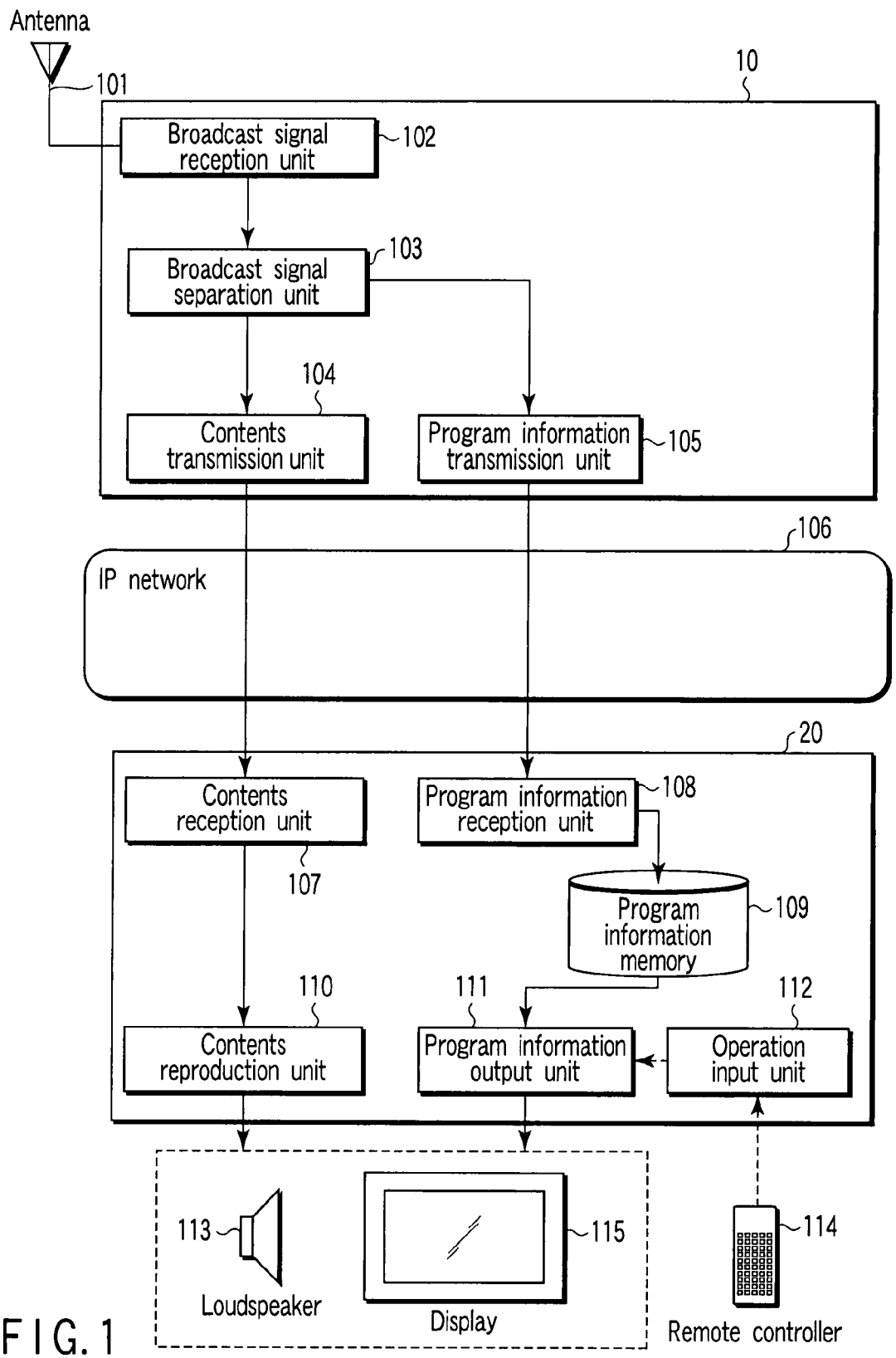
F I G. 1

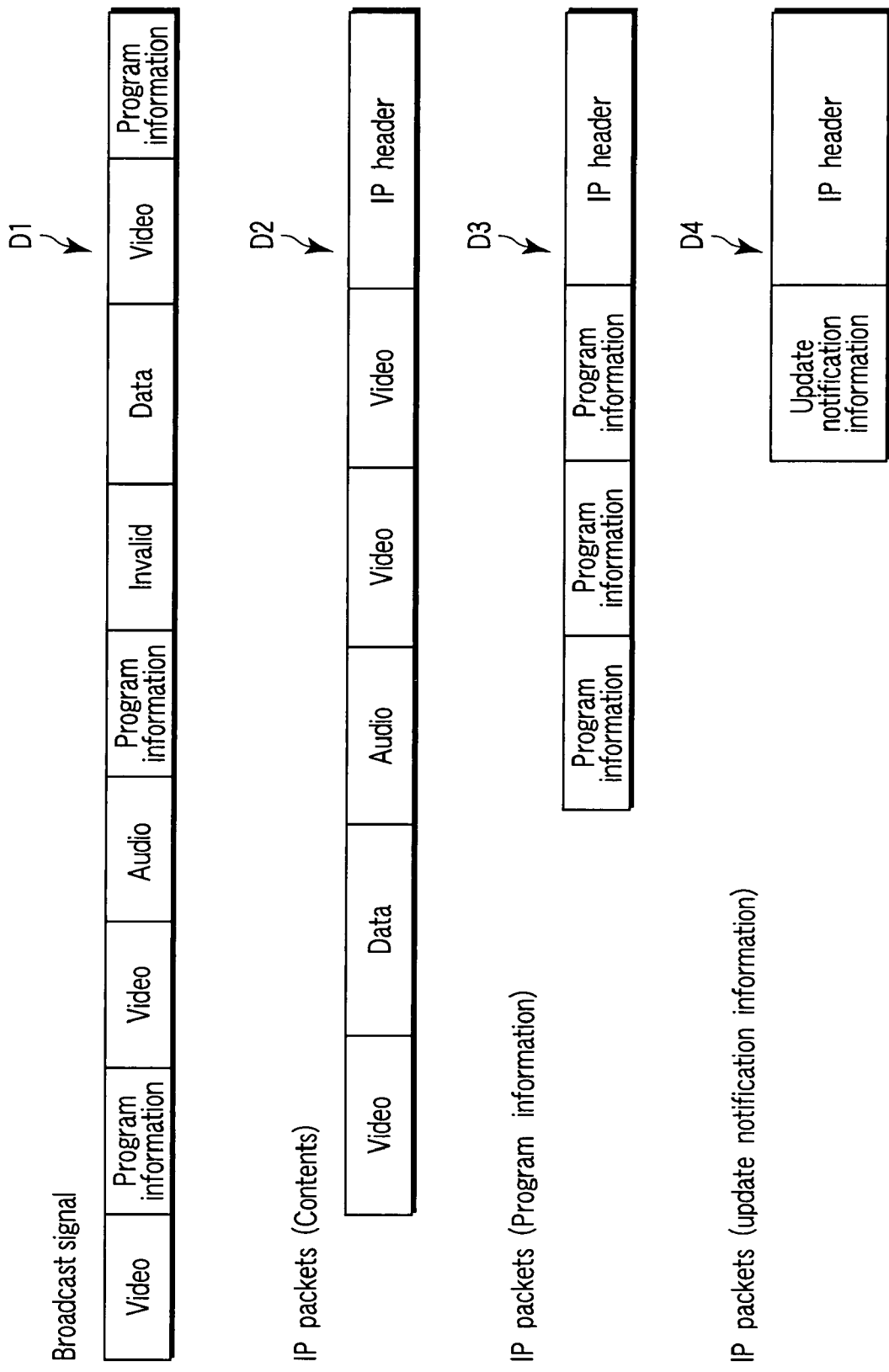
F I G. 8

BROADCAST SYSTEM, AND ITS DISTRIBUTION DEVICE AND TERMINAL DEVICE

CROSS-REFERENCE TO RELATED APPLICATIONS

This application is based upon and claims the benefit of priority from prior Japanese Patent Applications No. 2006-253297, filed Sep. 19, 2006; and No. 2007-197897, filed Jul. 30, 2007, the entire contents of both of which are incorporated herein by reference.

BACKGROUND OF THE INVENTION

1. Field of the Invention

The present invention relates to a broadcast system which distributes a digital broadcast signal via an Internet Protocol (IP) network, and its distribution device and terminal device.

2. Description of the Related Art

In digital broadcasting, including terrestrial digital broadcasting, there exist low-signal-strength areas just as with analog broadcasting. As a countermeasure, a system to transmit a broadcast signal not by radio but through a wired line is needed.

In digital broadcasting, whole items of information to be transmitted are digitized and video information, audio information, data information, and program information consisting of the broadcast signal is multiplexed as digital information to be transmitted. Therefore, as for the countermeasure for the low-signal-strength areas of the broadcast signal, it is possible to use the existing digital network, transmit the broadcast signal as a digital signal, and distribute it to viewers in the low-signal-strength areas.

Therefore, a relay device which converts the received broadcast signal into IP packets to distribute it via an IP network as a multicast is proposed (e.g., refer to Jpn. Pat. Appln. KOKAI Publication 2004-23600).

However, in the case of use of a cable digital network, because an information transmission band of a subscriber accommodation part is limited especially, if the broadcast signal is digitized as it is to be transmitted, a problem, such that sufficient quality cannot be obtained and a large number of channels cannot be freely viewed, occurs.

BRIEF SUMMARY OF THE INVENTION

It is an object of the invention to provide a broadcast system, and its distribution device and terminal device capable of assuring sufficient quality and distributing a broadcast signal even in a limited information transmission band in a subscriber accommodation part.

According to one aspect of the present invention, there is provided a broadcast system which distributes a broadcast signal in which program contents and program information concerning the program contents are multiplexed to an arbitrary terminal device on a network by a distribution device, wherein the distribution device comprises an providing unit which provides the broadcast signal; a separation unit which separates the program contents and the program information from the broadcast signal provided by the providing unit; a program contents distribution unit which converts the program contents separated by the separation unit into Internet Protocol packets and sets a first connection to the terminal device via the network to distribute the packets; and a program information distribution unit which converts the program information separated by the separation unit into Internet Protocol packets and sets a second connection differing from the first connection to the terminal device to distribute the packets, and the terminal device comprises a program contents reception unit which sets the first connection via the network to receive the program contents to be distributed; a program information reception unit which sets the second connection via the network to receive the program information to be distributed; a reproduction unit which reproduces the program contents received by the program contents reception unit; a memory which stores the program information received by the program information reception unit; and an output unit which receives an output request for the program information and reads out the corresponding program information from the memory to output it.

In the aforementioned configuration, the distribution device separates program contents such as video/audio/data information and program information such as electronic program guide (EPG) from the broadcast signal, converts each of them into IP packets, respectively, then, distributes the IP-packetized program contents and program information by setting different connections for them, respectively. Thereby, since a band relevant to the transmission of the program contents can be saved, even in the limited information transmission band of the subscriber accommodation part, the distribution device becomes able to transmit the video/audio/data information, etc., that are the program contents with sufficient quality.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a preferred block diagram illustrating a configuration of a broadcast system regarding the first embodiment of the invention;

FIG. 8 is a preferred view illustrating examples of IP packets of a broadcast signal to be transmitted in the broadcast system of FIG. 7;

DETAILED DESCRIPTION OF THE INVENTION

Hereinafter, embodiments of the invention will be described in detail with reference to the drawings.

First Embodiment

FIG. 1 is a block diagram showing a configuration of a broadcast system regarding the first embodiment of the invention. The system is composed by connecting between a distribution device 10 and a terminal device 20 via an IP network 106.

Figure 2:
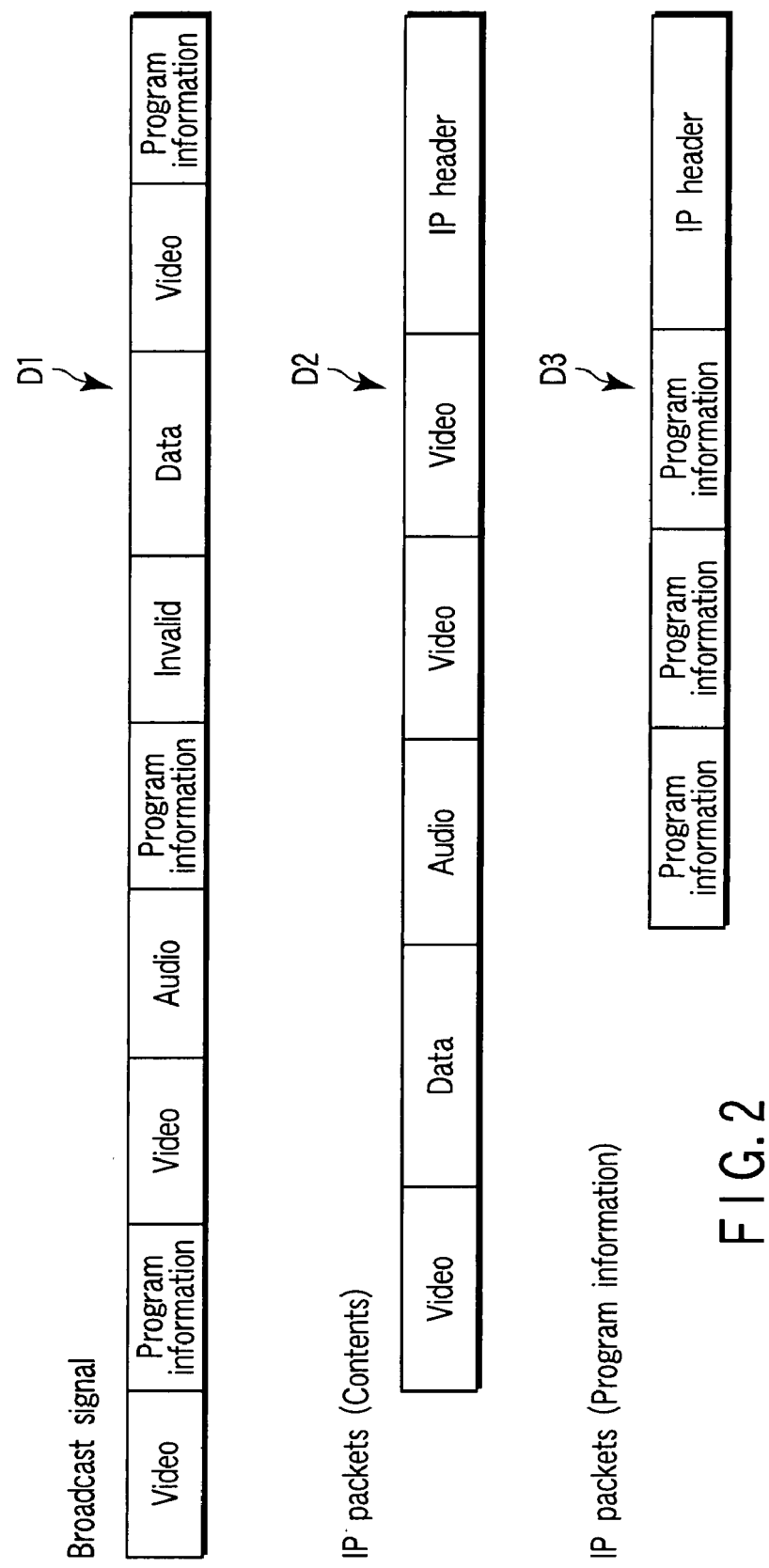
FIG. 2 is a preferred view illustrating examples of IP packets of a broadcast signal to be transmitted in the broadcast system of FIG. 1.

The distribution device 10 receives a digital broadcast signal by means of a broadcast signal reception unit 102 through an antenna 101. The received digital broadcast signal is supplied to a broadcast signal separation unit 103 and separated into program contents including video/audio/data and program information other than the program contents. The program information is information relevant to the program contents, and, for example, is an EPG. D1 in FIG. 2 shows an example of a broadcast signal to be received by the broadcast signal reception unit 102. In the broadcast signal, video/audio/data/program information/invalid information are multiplexed, and the broadcast signal separation unit 103 extracts the program information from the broadcast signal and also deletes the invalid information.

Among the items of separated information, program contents (video/audio/data) is supplied to a contents transmission unit 104. The transmission unit 104 integrates the separated video/audio/data information and converts it into a packet format able to be transmitted to the IP network 106. D2 of FIG. 2 shows an example of IP packets. IP network header information such as address information necessary for IP transmission is added to the separated program contents, which is then packetized.

The IP-packetized program contents is transmitted in the packet format depicted by D2 of FIG. 2 from the transmission unit 104 through the IP connection which is set on the IP network 106. The IP network 106 is an IP network having a multicast transmitting function, and the IP packets are transmitted from the distribution device 10 to a multicast group prescribed by a group ID informed in address information. FIG. 1 depicts an example of the terminal device 20 belonging to this multicast group.

For example the terminal device 20 includes an Internet Protocol television (IPTV) and a set-top box (STB). The terminal device 20 receives packets incoming via the IP network 106 by means of a program contents reception unit 107 to supply the received information on the packets to a program contents reproduction unit 110. The reproduction unit 110 reproduces the video/audio/data in response to each output format. The terminal device 10 displays the reproduced video and data information on a display 115 and outputs the audio from a loudspeaker 113.

As mentioned above, the system can distribute the digital broadcast signal transmitted as the broadcast signal via the IP network 106 that is a cable digital network.

In the meantime, the program information separated by the separation unit 103 is supplied to the program information transmission unit 105, and converted into IP packets to be transmitted to the IP network 106. The program information transmission unit 105 generates packets in which IP network header information is added to the program information in the same way as that of the contents transmission unit 104. D3 of FIG. 2 depicts an example of a packet.

The program information that is packetized by program information transmission unit 105 is distributed in the multicast format in the same manner as that by contents transmission unit 104; however it is transmitted by setting an IP connection different from that of the IP packets to be transmitted from the contents transmission unit 104.

Since the multicast system on the IP network can determines the possibility of the reception in accordance with the request from the terminal device 20, distributing program information having no need to be received always by setting other connection enables receiving the program information according to the determination by the terminal device 20 if necessary.

The following will describe operations of the terminal device 20. The program information incoming via the IP network 106 is received by a program information reception unit 108 to be stored in a program information memory 109. Program information which has been received is stored in the memory 109. As there is the case in which the program information is updated and changed one after another, the terminal device 20 keeps its information up to date by always overwriting the information stored in the memory 109 by the use of the information received by the information reception unit 108.

A remote controller 114 is an operation input device for a user to operate the terminal device 20. Button operations of the controller 114 enable switching of channels, etc. The controller 114 functions to input to the terminal device 20 a request for displaying the program information of the EPG, etc., on the screen of a display 115.

When detecting the display request of the program information input from the controller 114, an operation input unit 112 outputs an instruction to output the program information to a program information output unit 111. The output unit 111 refers to the program information in the memory 109 by the display request and outputs the program information required by the user to the display 115.

As mentioned above, in the first embodiment, the distribution device 10 separates the broadcast signal into the program contents (video, audio, and data) and the program information by the separation unit 103. The contents transmission unit 104 converts the separated program contents into IP packets, and sets a connection on the IP network 106 to transmit the IP packets. The separated program information is converted into the IP packets through the program information transmission unit 105. The program information transmission unit 105 sets the IP connection differing from the connection through which the program contents is transmitted to transmit the IP-packetized program information.

Therefore, according to the first embodiment, because the broadcast system does not need to always receive the program information, the system may effectively utilize its transmission band. The system thereby enables constructing circumstances, such that achieve videos with high quality and the simultaneous reception of a plurality of channels, desired by a viewer.

Separating the program information and deleting the invalid information included in the broadcast signal by the separation unit 103 enables deleting the quantity of data to be distributed as the program contents and utilizing the transmission band further effectively.

Having described out the first embodiment as the case in which the broadcast signal received by the broadcast signal reception unit 102 through the antenna 101 is re-distributed, it is possible, other than this case, for the invention to be applied to the case in which a storage device is provided for the distribution device 10 instead of the antenna 101 and the reception unit 102 to distribute the digital broadcast data stored in the storage device.

Second Embodiment

The broadcast system regarding the second embodiment of the invention receives a plurality of broadcast signals (channels), separates the program contents and the received plurality of broadcast signals, respectively, and multiplexes the program information of the separated plurality of channels to transmit it to the IP network.

Figure 3:
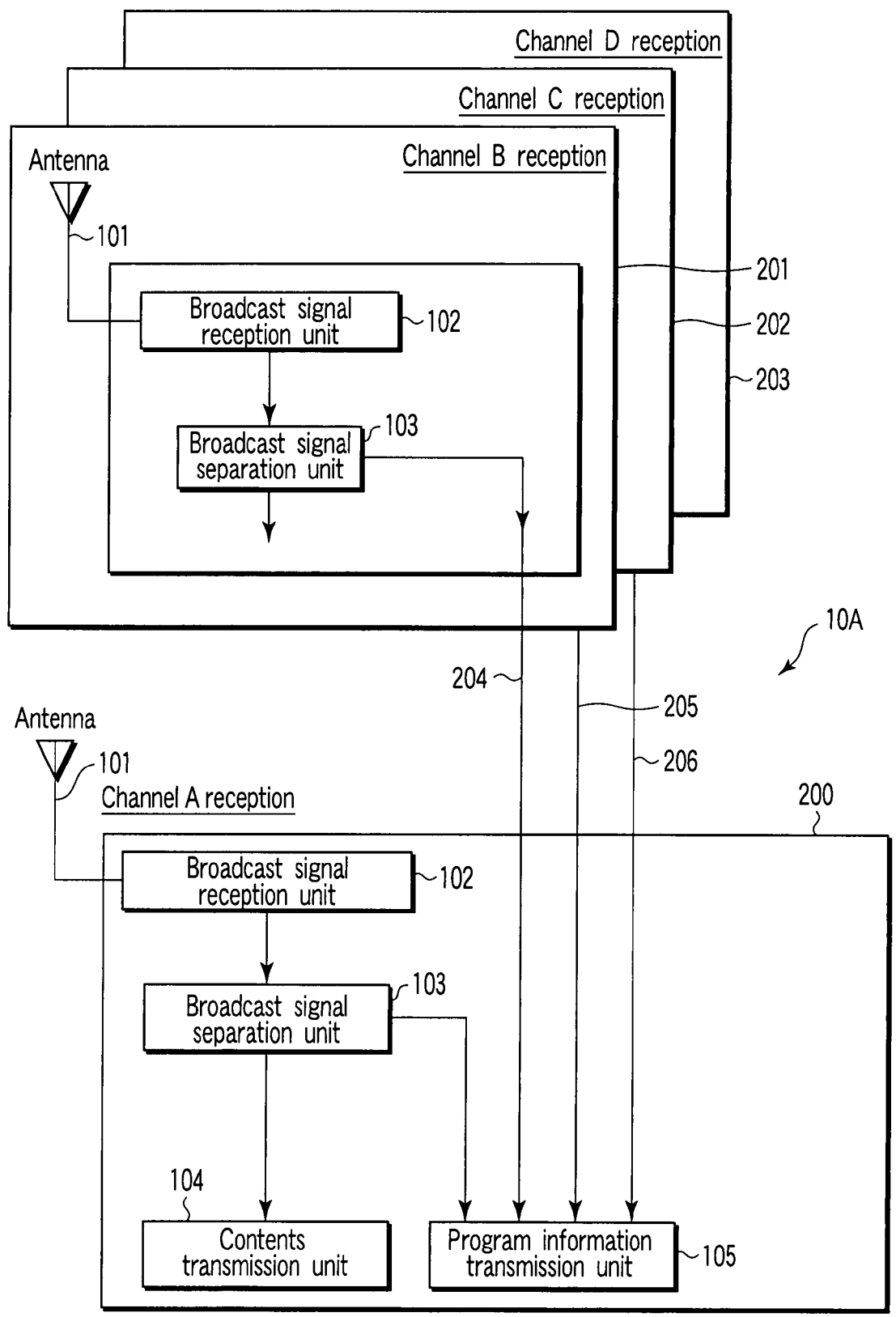
FIG. 3 is a preferred block diagram illustrating a configuration on a transmission side of a broadcast system regarding the second embodiment of the invention.

FIG. 3 is a block diagram depicting a configuration of the transmission side of the broadcast system regarding the second embodiment of the invention. The same component as that of FIG. 1 is designated by the identical symbol and the detailed description will be eliminated.

A distribution device 10A includes a distribution device 200 receiving a channel A; a distribution device 201 receiving a channel B; a distribution device 202 receiving a channel C; and a distribution device 203 receiving a channel D. In the second embodiment, the distribution device 10A has a configuration to receive four channels; however the number of channels to be received may be selected arbitrarily.

The distribution device 200 receives the channel A through the antenna 101 by the broadcast signal reception unit 102. The broadcast signal separation unit 103 separates the program information from the broadcast signal in the received channel A. The separated program contents of the channel A is supplied to the contents transmission unit 104 and converted into IP packets to be distributed. The separated program information of the channel A is supplied to the program information transmission unit 105.

Similarly, the broadcast signal separation units 103 of the distribution devices 201-203 separate the program information from each channel received by the broadcast signal reception unit 102. The program information of separated each channel is supplied to the program information transmission unit 105 of the distribution device 200 through transmission paths 204, 205 and 206, respectively. The program information transmission unit 105 of the distribution device 200 multiplexes the program information of the four channels A, B, C and D to convert it into the IP packets, and transmits the converted IP packets to the IP network by setting a connection differing from the connection set by the contents transmission unit 104.

Like this, in the second embodiment, the distribution device 10A individually receives the broadcast signals of each channel distributed through a plurality of broadcast frequencies, separates each item of the program information from the broadcast signal of each channel, multiplexes the separated program information, packetizes and distributes it.

In this way, the system, for example, enables distributing the program information of all channels in a region and enriching the contents of the program information to be provided for the viewer.

Third Embodiment

The third embodiment of the invention manages the program information by means of the distribution device and distributes only the updated program information to the terminal device.

Figure 4:
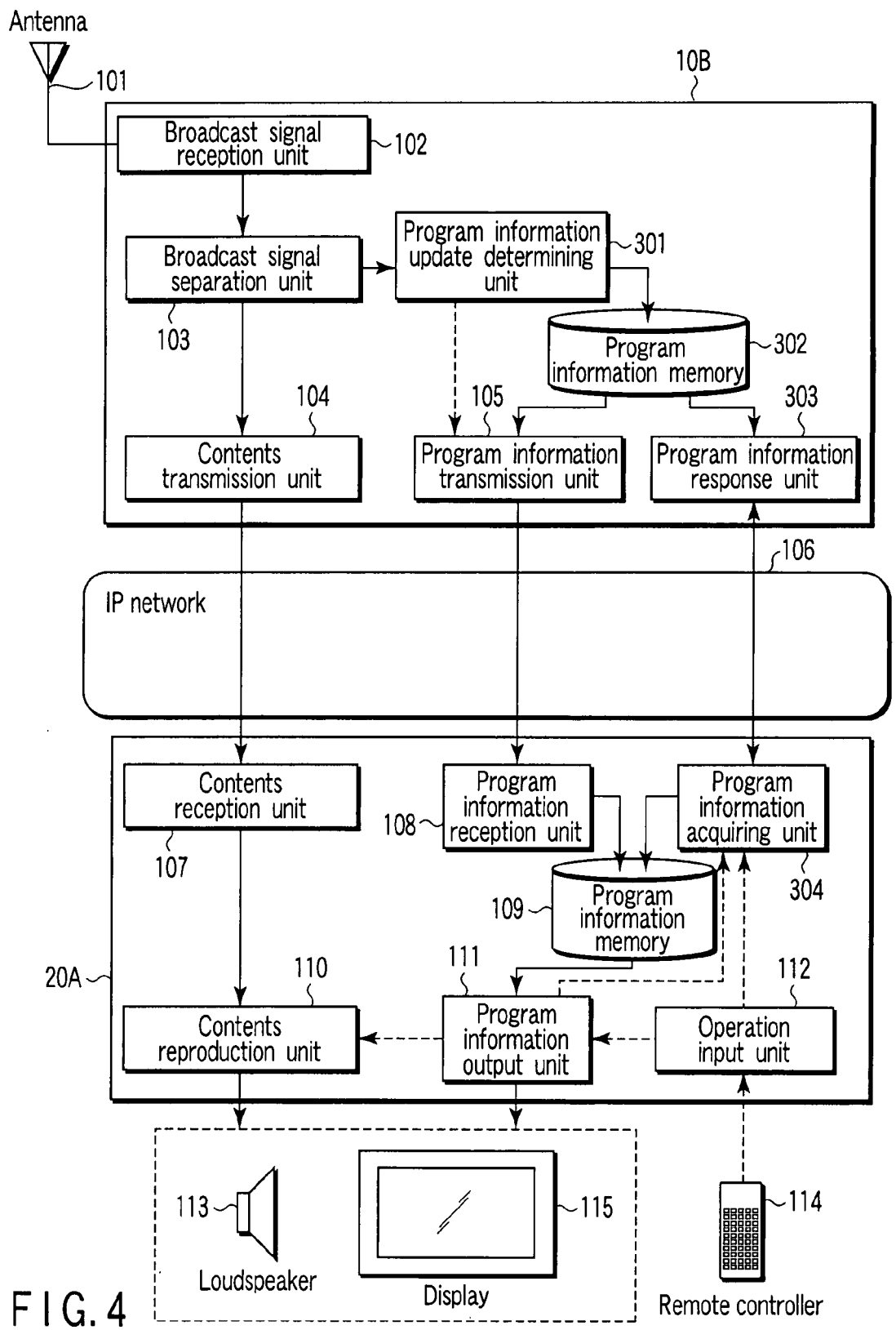
FIG. 4 is a preferred block diagram illustrating a configuration of a broadcast system regarding the third embodiment of the invention.

FIG. 4 is a block diagram showing a configuration of a broadcast system regarding the third embodiment of the invention. The same component as that of FIG. 1 is designated by the identical symbol, and its detailed description will be omitted.

A distribution device 10B further comprises a program information update determining unit 301; a program information memory 302; and a program information response unit 303 in addition to the configuration of the distribution device 10. The program information separated from the broadcast signal by means of the broadcast signal separation unit 103 is supplied to the determining unit 301.

The separation unit 103 separates the program information from the broadcast signal received by the reception unit 102 to supply the separated program information to the update determining unit 301. The update determining unit 301 compares the already received program information stored in a program information memory 302 to the program information supplied from the separation unit 103 to determine whether or not the separated program information is updated. When the update determining unit 301 determines that the program information is updated, the update determining unit 301 updates the program information to be stored in the memory 302, and instruct the program information transmission unit 105 to transmit the updated program information.

When receiving the transmission instruction, the program information transmission unit 105 reads out the updated program information from the memory 302, converts it into IP packets, and sets a connection to the IP network 106 to transmit the IP packets.

Since the program information in the broadcast signal is transmitted at a fixed period regardless of whether or not the program information is updated, detecting the updated part of the program information, and transmitting only the updated part enables further saving the transmission band. The terminal device becomes to receive the program information when the program information is updated, so that the system may decrease the load on the reception processing.

However, in the case of transferring only the updated program information, a means for acquiring the program information regardless of whether or not the program information is updated if the power supply of the terminal device is turned off once, or when the terminal device loses all items of the program information due to a certain reason.

Therefore, in FIG. 4, the terminal device 20A further includes a program information acquiring unit 304 in addition to the configuration of the terminal device 20. When receiving an instruction to acquire the program information from the operation input unit 112 by means of the remote controller 114, the acquiring unit 304 transmits a program information acquisition request to the distribution device 10B via the IP network 106.

When receiving the acquisition request, the response unit 303 reads out all pieces of program information from the memory 302 to convert it into IP packets. The converted IP packets are transmitted to the terminal 20A via the IP network 106 through the IP connecting set by the response unit 303. The acquitting unit 304 of the terminal device 20A stores all pieces of program information received via the IP network 106 in the memory 109.

As mentioned above, in the third embodiment, since the distribution device 10B distributes only the updated program information, the system may reduce a data quantity to be distributed to the network. Only when it becomes necessary for the terminal device 20A due to the turning on of the power, or due to the reset, the terminal device 20A requires all items of the program information, then, this way makes it possible for the terminal device 20A to immediately display the latest program information. This embodiment is especially effective in the case where the program information is updated with low frequency.

Fourth Embodiment

The fourth embodiment of the invention is a modified example of the third embodiment, and it does not distribute the updated program information by setting an independent IP connection, but transmits the updated program information by multiplexing with the program contents and by setting a single IP connection.

Figure 5:
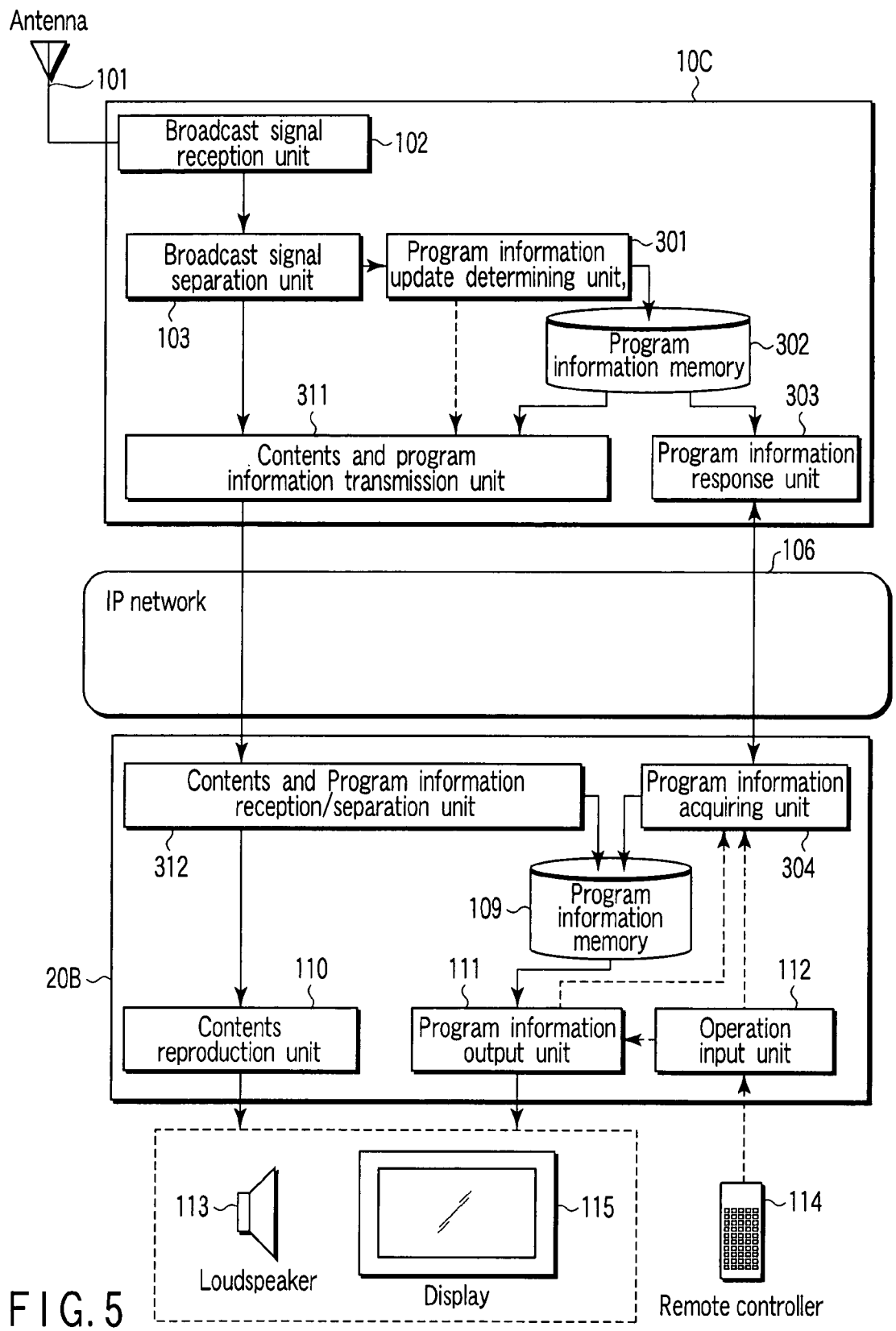
FIG. 5 is a preferred block diagram illustrating a configuration of a broadcast system regarding the fourth embodiment of the invention.

FIG. 5 is a block diagram illustrating a configuration of a broadcast system regarding the fourth embodiment of the invention. The same components as those of FIG. 4 are designated by the identical symbols and their detailed description will be eliminated.

The distribution device 10C has a contents and program information transmission unit 311 instead of the contents transmission unit 104. The terminal device 20B has a contents and program information reception/separation unit 312 instead of the contents reception unit 107.

The transmission unit 311 receives the updated program information when the update determining unit 301 determines that the program information is updated. The transmission unit 311 multiplexes the updated program information on the program contents (video, audio, and data) to convert it into IP packets, and sets a connection to the IP network 106 to transmit the IP packets. Here, the packets to be transmitted become packets in which only the updated part of the program information is embedded in addition to the video/audio/data information, etc.

The terminal device 20B receives the IP packets transmitted from the distribution device 10C by means of the separation unit 312 to separate the program contents from the updated program information. The separated program contents is supplied to the contents reproduction unit 110. The separated program information is stored in the memory 109.

As described above, in the fourth embodiment, only the updated program information is multiplexed together with the program contents (video, audio, and data) and transmitted by setting a single IP connection on the IP network 106. Since the broadcast system may reduce the data quantity to be distributed to the network, even if the updated part of the program information is multiplexed with the program contents and distributed, the system enables obtaining sufficient quality.

Fifth Embodiment

The fifth embodiment of the invention receives a plurality of broadcast signals (channels) as the same manner in the second embodiment, separates the program information from the received plurality of broadcast signals, respectively, multiplexes only the updated program information among the items of the program information of separated each channel to transmit it to the IP network.

Figure 6:
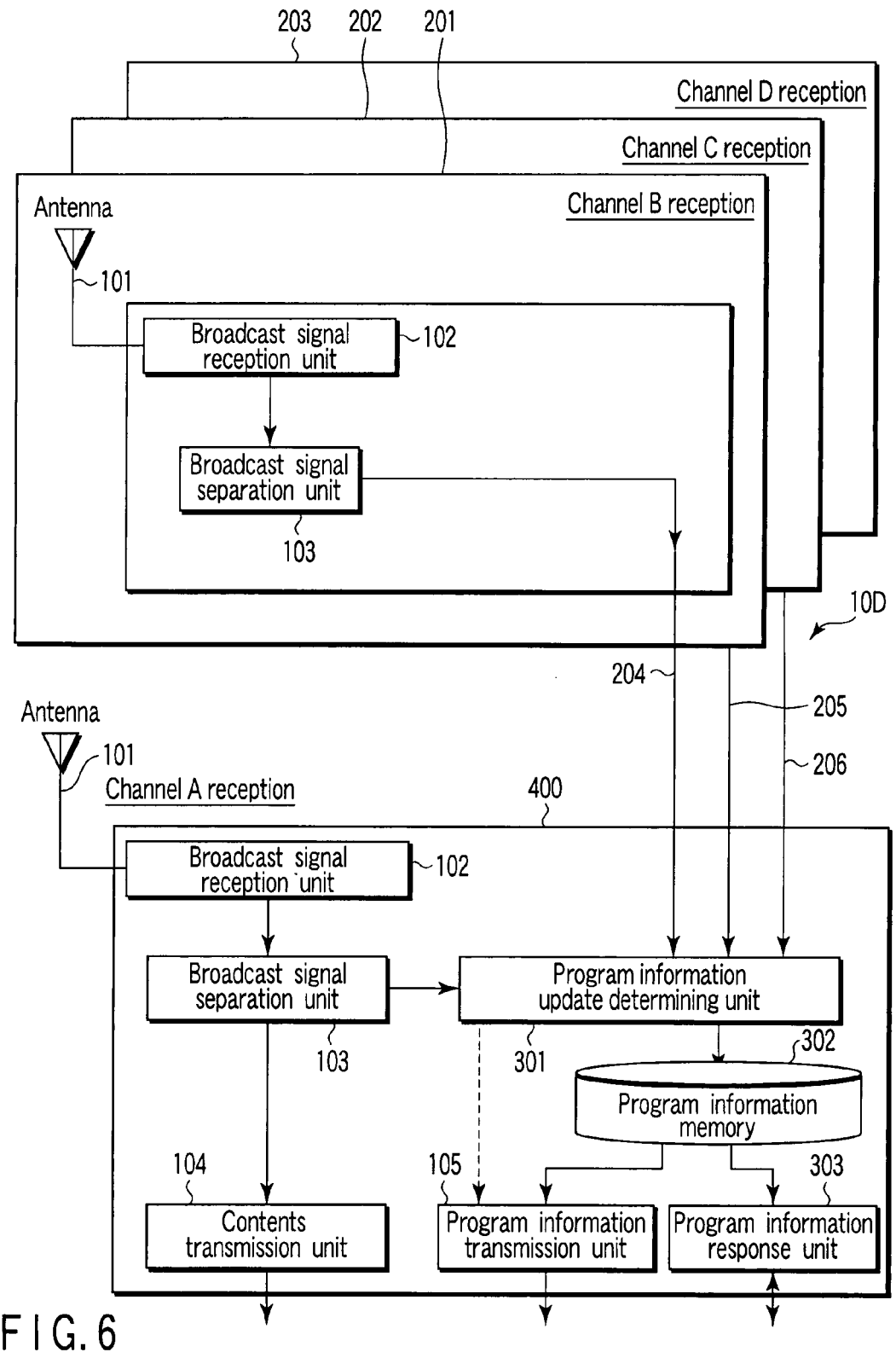
FIG. 6 is a preferred block diagram illustrating a configuration of a broadcast system regarding the fifth embodiment of the invention.

FIG. 6 is a block diagram depicting a configuration of a broadcast system regarding the fifth embodiment of the invention. The same components as those of FIG. 3 and FIG. 4 are designated the identical symbols and their detailed explanation will be eliminated.

The distribution device 10D includes a distribution device 400 receiving the channel A, a distribution device 201 receiving the channel B, a distribution device 202 receiving the channel C and a distribution device 203 receiving the channel D. In the fifth embodiment, the distribution device 10D is configured to receive four channels; however it may arbitrarily select the number of the channels to be received.

The distribution device 400 receives the channel A through the antenna 101 by the broadcast signal reception unit 102. The broadcast signal separation unit 103 separates the program information from the broadcast signal in the received channel A. The separated program information of the channel A is supplied to the program information update determining unit 301. Similarly, the broadcast signal separation units 103 of the distribution devices 201-203 separate the program information from the broadcast signals of each channel B-D received by the broadcast signal reception unit 102. The separated program information of the channels B-D is supplied to the distribution device 400 through the transmission paths 204, 205 and 206.

The each separated program information of the channels A-D is supplied to the update determining unit 301. The update determining unit 301 determines whether or not the program information on the channels A-D for each channel are updated. The update determination is performed by referring to the memory 302 and comparing between the already received program information and the supplied program information of each channel in a like manner of the third embodiment. When it is determined the program information is updated in the forgoing determination, the update determining unit 301 updates the program information stored in the memory 302, and instructs the transmission unit 105 to transmit the updated program information. When the update determining unit 301 determines that the program information is updated, the update determining unit 301 updates the program information to be stored in the memory 302, and instruct the program information transmission unit 105 to transmit the program information.

The transmission unit 105 reads out the updated program information of each channel from the memory 302, multiplexes and converts it into IP packets, sets a connection to the IP network 106 to transmit the IP packets.

As given above, the fifth embodiment makes it possible to distribute only the updated part of the program information of all channels in a region, so that the broadcast system may enrich the contents of the program information to provide for the viewer while saving the transmission band.

Sixth Embodiment

The sixth embodiment of the invention further applies the third embodiment, manages the program information by the distribution device, and when the program information is updated, it transmits the information of notifying the fact of the update to the terminal device.

Figure 7:
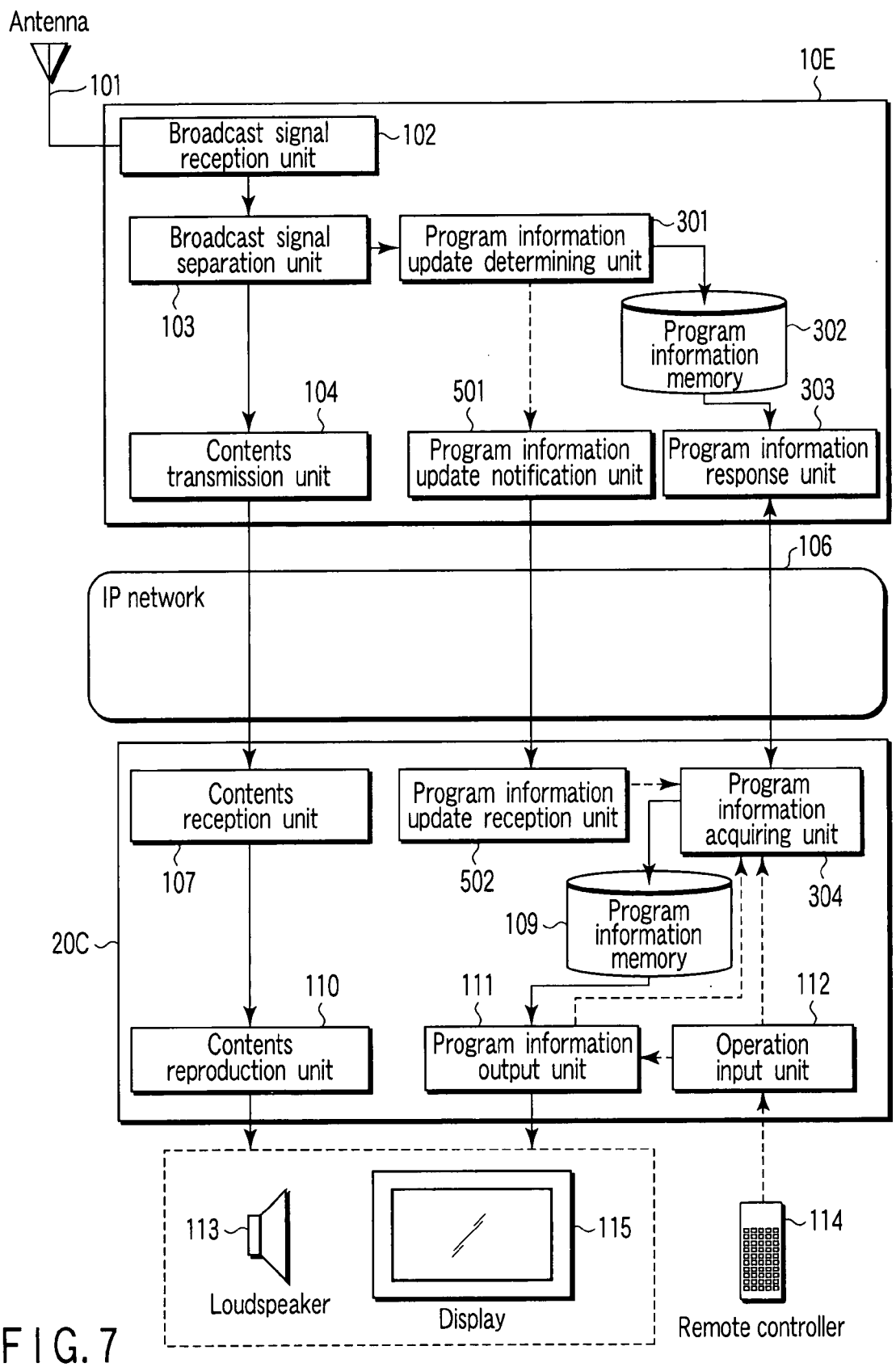
FIG. 7 is a preferred block diagram illustrating a configuration of a broadcast system regarding a sixth embodiment of the invention.

FIG. 7 is a block diagram showing a configuration of a broadcast system regarding the sixth embodiment of the invention. The same components as those of FIG. 4 are designated the identical symbols and the detailed description will be omitted.

In FIG. 7 a distribution device 10E is provided with a program information update notification unit 501 in stead of the program information transmission unit 105. The terminal device 20C is proved with a program information update reception unit 502 instead of the program information reception unit 108.

When receiving the information of the update of the program information from the update determining unit 301, the update notification unit 501 generates the information notifying the fact of the update of the program information to convert it into IP packets. The packets to be generated are IP packets consisting only of the information notifying the fact of the update of the program information as shown at D4 of FIG. 8 (hereinafter referred to as update notification information). The update notification unit 501 sets an IP connection differing from that of the contents transmission unit 104 to multicast-distribute the generated packets to the IP network 106.

On the other hand, when receiving the update notification information transmitted from the distribution device 10E in the update reception unit 502, the terminal device 20C instructs the acquisition of the program information to the program information acquiring unit 304. The acquiring unit 304 transmits an acquisition request for the program information to the distribution device 10E via the IP network 106, and stores the program information transmitted from the distribution device 10E in response to the acquisition request in the memory 109.

As given above, since the sixth embodiment may suppress the distribution information of the program information to an extremely low rate in which the distribution information includes only the update notification, the system becomes capable of transmitting the program contents of the video, audio, data, etc., that is main information further preferentially.

Seventh Embodiment

The seventh embodiment of the invention is a modified example of the sixth embodiment, and it does not distribute the update notification information of the program information by setting an independent IP connection, but by multiplexing with the program contents to set a single IP connection.

Figure 9:
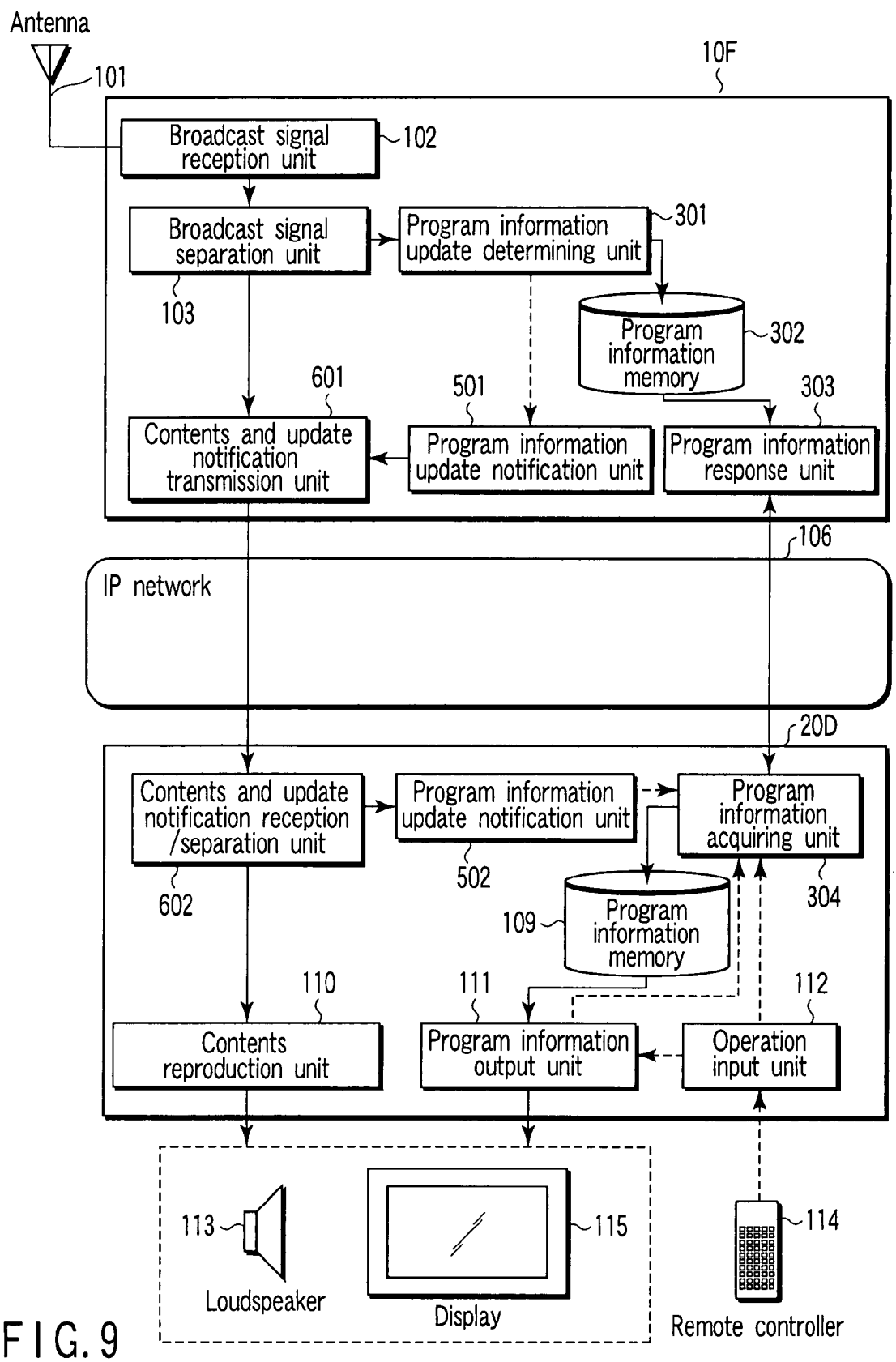
FIG. 9 is a preferred block diagram illustrating a configuration of a broadcast system regarding the seventh embodiment of the invention.

FIG. 9 is a block diagram depicting a configuration of a broadcast system concerning the sixth embodiment of the invention. The same components of those of FIG. 7 are designated by the identical symbols, and their detailed description will be eliminated.

A distribution device 10F includes a contents and update notification transmission unit 601 in place of the contents transmission unit 104. The terminal device 20D has a contents and update notification reception/separation unit 602 in stead of the contents reception unit 107.

Figure 10:
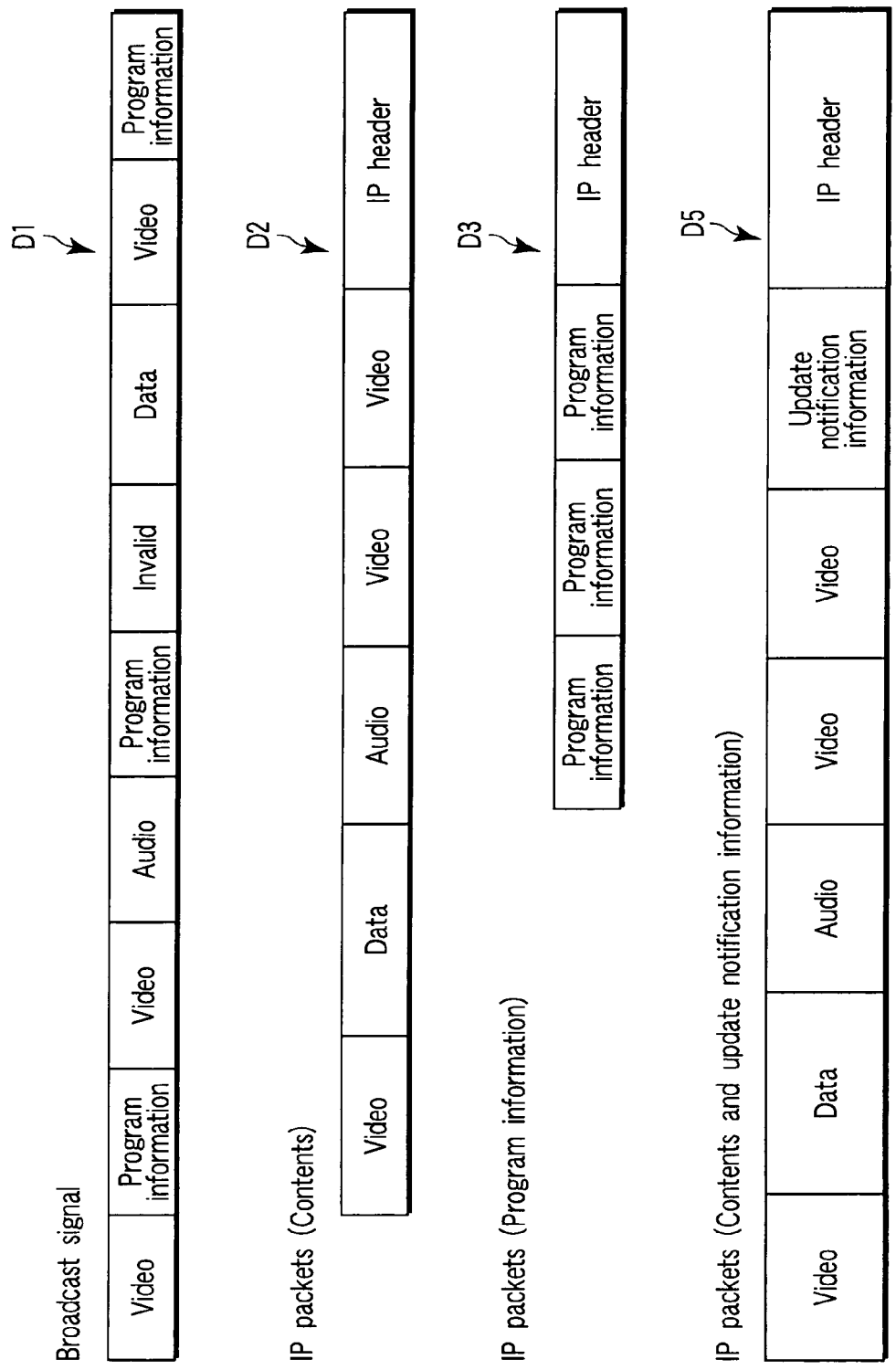
FIG. 10 is a preferred view illustrating examples of IP packets of a broadcast signal to be transmitted in the broadcast system of FIG. 9.

When receiving the update notification information from the update notification unit 501, the contents and update notification transmission unit 601 multiplexes the update notification information on the program contents (video, audio, data) to convert it into IP packets, and sets a connection to the IP network to transmit the IP packets. The packets to be distributed become packets in which information notifying the fact of the update of the program information (update notification information) in addition to the video, audio, data information, etc., as shown at D5 in FIG. 10.

The terminal device 20D receives the IP packets transmitted from the distribution device 10F by means of the reception/separation unit 602 to separate the program contents and the update notification information. The separated update notification information is supplied to the update notification unit 502. When receiving the update notification information, the update notification unit 502 instructs to transmit an acquisition request for the updated program information to the acquiring unit 304. The acquiring unit 304 transmits the program information acquiring request to the distribution device 10D in accordance with the instruction. The acquiring unit 304 stores the program information transmitted from the distribution device 10D in response to the acquisition request in the memory 109.

As aforementioned, in the seventh embodiment, the broadcast system multiplexes only the information notifying the fact of the update of the program information together with the program contents (video, audio, and data) and transmits the information by setting a single IP connection. Thereby, in comparison to the fourth embodiment, since the system may further reduce the data quantity to be distributed to the network, even when the system multiplexes the updated part of the program information with the program contents, the system may obtain sufficient quality.

It is our intention that the invention is not limited to each aforementioned embodiment shown and described herein, and in an implementation phase, this invention may be embodied in various forms without departing from the spirit or scope of the general inventive concept thereof. Various types of the invention can be formed by appropriately combining a plurality of constituent elements disclosed in the foregoing embodiments. Some of the element, for example, may be omitted from the whole of the constituent elements shown in each embodiment. Further, the constituent elements over different embodiments may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A distribution device that distributes a broadcast signal in which program contents and program information concerning the program contents are multiplexed to an arbitrary terminal device on a network, the distribution device comprising:

a providing unit that provides the broadcast signal;

a separation unit that separates the program contents and the program information from the broadcast signal provided by the providing unit and deletes invalid information when the broadcast signal provided from the providing unit includes the invalid information;

a program contents distribution unit that converts the program contents separated by the separation unit into Internet Protocol packets and sets a first connection to the terminal device via the network to distribute the packets; and a program information distribution unit that converts the program information separated by the separation unit into Internet Protocol packets and sets a second connection differing from the first connection to the terminal device to distribute the packets.

2. A distribution device that distributes a broadcast signal in which program contents and program information concerning the program contents are multiplexed to an arbitrary terminal device on a network, the distribution device comprising:

a providing unit for providing the broadcast signal;

a separation unit for separating the program contents and the program information from the broadcast signal provided by the providing unit;

a memory for storing the program information separated by the separation unit;

a determining unit for comparing the program information separated by the separation unit and the program information stored in the memory to determine whether or not the program information is updated;

a program contents distribution unit for converting the program contents separated by the separation unit into Internet Protocol packets and setting a first connection to the terminal device via the network to distribute the packets; and a program information distribution unit for converting updated program information separated by the separation unit into Internet Protocol packets and setting a second connection differing from the first connection to the terminal device via the network to distribute the packets when the determining unit determines that the program information is updated.

3. The distribution device according to claim 2, wherein the program contents distribution unit, when the determining unit determines that the program information is updated, multiplexes the updated program information with the program contents to convert it into Internet Protocol packets and sets the first connection via the network to distribute the packets.

4. The distribution device according to claim 2, wherein the program information distribution unit, when it receives an acquisition request for the program information from the terminal device, converts the program information separated by the separation unit into Internet Protocol packets and sets the second connection via the network to distribute the packets.

5. The distribution device according to claim 2, wherein the providing unit provides a plurality of broadcast signals, and the separation unit separates each of the provided plurality of broadcast signals into program contents and program information to form a plurality of items of program contents and program information each correspond to the plurality of broadcast signals, and the distribution device further comprises:

a memory that stores the plurality of items of program information; and a determining unit that compares between the plurality of items of program information each separated by the separation unit and each program information stored in the memory to determine whether or not the program information is updated program, wherein the program information distribution unit, when the determining unit determines that the program information is updated, converts the updated program information into Internet Protocol packets and sets the second connection via the network to distribute the packets.

6. The distribution device according to claim 2, further comprising:

a memory that stores the program information separated by the separation unit; and a determining unit that compares between the program information separated by the separation unit and the program information stored in the memory to determine whether or not the program information is updated, wherein the program information unit, when the determining unit determines that the program information is updated, multiplexes information notifying the fact of the update of the program information with the program contents to convert it into Internet Protocol packets and sets the first connection via the network to distribute the packets.

7. The distribution device according to claim 6, wherein: the program contents distribution unit, when the determining unit determines that the program information is updated, multiplexes the information notifying the fact of the update of the program information with the program contents to convert it into Internet Protocol packets and sets the first connection via the network to distribute the packets.

8. A terminal device to be connected to a distribution device including (i) a separation unit that separates program contents and program information from a broadcast signal in which the program contents and the program information concerning program contents are multiplexed;

(ii) a memory that stores the program information separated by the separation unit;

(iii) a determining unit that compares the program information separated by the separation unit with the program information stored in the memory to determine whether the program information is updated;

(iv) a program contents distribution unit that converts the program contents separated by the separation unit into Internet Protocol packets and sets a first connection to the terminal device via the network to distribute the packets; and (v) a program information distribution unit that converts an updated part of the program information separated by the separation unit into Internet Protocol packets and sets a second connection differing from the first connection to the terminal device to distribute the packets when the determining unit determines that the program information is updated, and the terminal device comprising:

a program contents reception unit that receives Internet-Protocol-packetized program contents to be distributed from the distribution device by setting a first connection via the network;

a program information reception unit that receives the Internet-Protocol-packetized program information to be distributed from the distribution device by setting a second connection via the network;

a reproduction unit that reproduces the program contents received by the program contents reception unit;

a memory that stores the updated part of program information received by program information reception unit;

an output unit that reads out to output the corresponding program information from the memory in response to an output request for the program information; and a program information acquiring unit that transmits a request for acquiring all pieces of the program information to the distribution device when the program information is not stored in the memory of the terminal device and acquires all pieces of the program information from the distribution device.

9. The terminal device according to claim 8, wherein the program information acquiring unit transmits the acquisition request when the program information reception unit receives information notifying the fact of update of the program information from the distribution device.

* * * * *

UNITED STATES PATENT AND TRADEMARK OFFICE
CERTIFICATE OF CORRECTION

| | | |
|---|---|---|
| PATENT NO. | : 7,900,232 B2 | Page 1 of 1 |
| APPLICATION NO. | : 11/892679 | |
| DATED | : March 1, 2011 | |
| INVENTOR(S) | : Osaki et al. | |

It is certified that error appears in the above-identified patent and that said Letters Patent is hereby corrected as shown below:

Title page, Item (57), in the Abstract, line 4, change "is converted" to --are converted--.

Claim 5, column 11, line 32, change "each correspond" to --each corresponding--.

Claim 5, column 11, line 41, change "program" to --program information--.

Signed and Sealed this
Thirty-first Day of May, 2011

David J. Kappos
*Director of the United States Patent and Trademark Office*